(12) United States Patent
Ohligschläger et al.

(10) Patent No.: US 12,523,219 B2
(45) Date of Patent: Jan. 13, 2026

(54) HYDRAULIC CIRCUIT

(71) Applicant: Thomas Magnete GmbH, Herdorf (DE)

(72) Inventors: Olaf Ohligschläger, Grünebach (DE); Robert Heinz, Hachenburg (DE); Etienne Dautry, Daaden (DE); Christian Kretzer, Daaden (DE)

(73) Assignee: Thomas Magnete GmbH, Herdorf (DE)

( * ) Notice: Subject to any disclaimer, the term of this patent is extended or adjusted under 35 U.S.C. 154(b) by 0 days.

(21) Appl. No.: 18/805,935

(22) Filed: Aug. 15, 2024

(65) Prior Publication Data

US 2025/0059967 A1    Feb. 20, 2025

(30) Foreign Application Priority Data

Aug. 18, 2023 (DE) .......................... 102023120863.2

(51) Int. Cl.
    *F04B 49/22*    (2006.01)
(52) U.S. Cl.
    CPC .................................. *F04B 49/22* (2013.01)
(58) Field of Classification Search
    CPC .. F04B 49/22; F15B 11/028; F15B 2211/205; F15B 2211/20561; F15B 2211/30505; F15B 2211/3052; F15B 2211/329
    See application file for complete search history.

(56) References Cited

U.S. PATENT DOCUMENTS

| | | | | |
|---|---|---|---|---|
| 2007/0289442 | A1* | 12/2007 | Waller | .................. B60T 8/4031 92/172 |
| 2014/0037488 | A1* | 2/2014 | Glen | ..................... F01C 21/108 418/160 |

(Continued)

FOREIGN PATENT DOCUMENTS

| | | |
|---|---|---|
| DE | 102009048271 A1 | 4/2011 |
| DE | 102020114509 B3 | 5/2021 |

(Continued)

OTHER PUBLICATIONS

German Search Report from the German Patent and Trademark Office for related German Application No. 102023120863.2 dated Apr. 10, 2024, 16 pages.

(Continued)

*Primary Examiner* — Anthony Ayala Delgado
(74) *Attorney, Agent, or Firm* — Harness, Dickey & Pierce, P.L.C.

(57) ABSTRACT

A hydraulic circuit comprising a high-pressure connection, a low-pressure connection, a supply unit, and a pump system. The low-pressure connection is fluidically connected to the high-pressure connection by a series circuit of the supply unit and the pump system. The pump system has a pump for conveying a fluid, a shaft for driving the pump, and a stop-check valve system. In a first state, the pump conveys the fluid from a first pump connection to a second pump connection through the check valve to the high-pressure connection. In a second state, the pump conveys the fluid from the second pump connection to the first pump connection and to a control connection of the check valve. The check valve prevents a fluid flow from the high-pressure connection to the first pump connection and allows a fluid flow from the first pump connection to the high-pressure connection. A fluid flow from the high-pressure connection to the first pump connection can be enabled via the control (Continued)

connection. The supply unit is configured to allow a fluid flow from the low-pressure connection to the pump connection which is drawing in and to prevent a fluid flow from the ejecting pump connection to the low-pressure connection. The pump has a leakage flow towards the shaft when the fluid is conveyed. The shaft is connected to the low-pressure connection by a pressure equalization line in order to conduct the fluid away from the shaft.

12 Claims, 5 Drawing Sheets

(56) References Cited

U.S. PATENT DOCUMENTS

| | | | |
|---|---|---|---|
| 2015/0267701 A1* | 9/2015 | Pippes | F04C 2/084 |
| | | | 417/410.4 |
| 2023/0219392 A1* | 7/2023 | Stolle | B60G 17/0155 |
| | | | 280/124.125 |

FOREIGN PATENT DOCUMENTS

| | | |
|---|---|---|
| DE | 102020105270 A1 | 9/2021 |
| EP | 2349762 B1 | 11/2013 |
| WO | 2023152634 A1 | 8/2023 |

OTHER PUBLICATIONS

European Search Report from the European Patent Office for related European Application No. 24191462.1 dated Jan. 8, 2025, 6 pages.

* cited by examiner

HYDRAULIC CIRCUIT

CROSS-REFERENCE TO RELATED APPLICATIONS

This application claims the benefit and priority of German Application No. DE 102023120863.2 filed Aug. 18, 2023. The entire disclosure of the above application is incorporated herein by reference.

FIELD

The invention relates to a hydraulic circuit.

BACKGROUND

This section provides background information related to the present disclosure which is not necessarily prior art.

Hydraulic systems for building up and reducing pressure have a high-pressure connection, a low-pressure connection, a supply unit, a pump and a stop-check valve. In a first state, a fluid is drawn in by the pump via the supply unit and the low-pressure connection and conveyed through the check valve to the high-pressure connection. A pressure buildup at the high-pressure connection is thereby realized. In a second state, the fluid is conveyed via the supply unit and the low-pressure connection to a control connection of the check valve. This allows a fluid flow from the high-pressure connection through the check valve in the blocking direction of the check valve. A pressure reduction at the high-pressure connection is thereby realized.

In the second state, the fluid is conveyed to the control connection of the check valve until a predefined pressure results at the control connection. However, hardly any or no fluid flows via the control valve. The pump reliably maintains a pressure only as long as the pump is conveying a fluid. Therefore, to maintain the pressure at the control valve, a fluid must be conveyed through the pump constantly. At present, an additional line is required to discharge the excess fluid. This additional line is arranged between the pump and the control connection of the check valve.

SUMMARY

This section provides a general summary of the disclosure, and is not a comprehensive disclosure of its full scope or all of its features.

The system provides a hydraulic circuit which allows a targeted pressure buildup and pressure reduction at a high-pressure connection and minimizes a number of fluid lines of the hydraulic circuit.

The hydraulic circuit comprises a high-pressure connection, a low-pressure connection, a supply unit, and a pump system. The low-pressure connection is fluidically connected to the high-pressure connection by means of a series circuit of the supply unit and the pump system. The pump system has a pump for conveying a fluid, a shaft for driving the pump, and at least one stop-check valve system. The pump is configured to convey the fluid from a first pump connection to a second pump connection in a first state and to convey the fluid from the second pump connection to the first pump connection in a second state. The check valve system is fluidically connected to the second pump connection at a first valve connection and to the high-pressure connection at a second valve connection. The check valve system is designed to prevent a fluid flow from the second valve connection to the first valve connection and to allow a fluid flow from the first valve connection to the second valve connection. The check valve system has a control connection via which a fluid flow from the second valve connection to the first valve connection can be enabled. The hydraulic circuit is designed to enable the fluid flow from the second valve connection to the first valve connection via the control connection when the pump is in the second state. The supply unit is configured to allow a fluid flow from the low-pressure connection at the first pump connection and to prevent a fluid flow from the second pump connection to the low-pressure connection in a first state of the pump. The supply unit is configured to allow a fluid flow from the low-pressure connection at the second pump connection and to prevent a fluid flow from the first pump connection to the low-pressure connection in a second state of the pump. The pump has a leakage flow towards the shaft when the fluid is conveyed. The shaft is connected to the low-pressure connection by means of a pressure equalization line in order to conduct the fluid away from the shaft. Alternatively or additionally, the check valve system has a leakage flow between the control connection and the first valve connection when the pump is in the second state.

In the first state, the fluid is drawn in from the low-pressure connection via the first pump connection and conveyed via the second pump connection to the first valve connection. The supply unit prevents a backflow of the fluid from the second pump connection to the low-pressure connection. The fluid is then conveyed through the check valve system to the second valve connection and the high-pressure connection. In the first state, a fluid is thus conveyed from the low-pressure connection, through the pump and the check valve system, into the high-pressure connection, and a pressure of the fluid at the high-pressure connection is increased. A fluid can thus be supplied to the high-pressure connection in an actively controllable manner by actuation of the pump. If the pump ceases conveying, fluid no longer passes from the low-pressure connection, through the pump and the check valve system, to the high-pressure connection. A backflow of the fluid out of the high-pressure connection through the pump to the low-pressure connection is prevented by the check valve system.

In the second state, the fluid is drawn in from the low-pressure connection via the second pump connection and conveyed via the first pump connection to the control connection of the check valve system. The supply unit prevents a backflow of the fluid from the first pump connection to the low-pressure connection. Owing to the pressure buildup at the control connection, the check valve system allows a fluid flow from the high-pressure connection, via the second valve connection, the check valve system and the first valve connection. A fluid can thus be conducted away from the high-pressure connection in an actively controllable manner by actuation of the pump, and a pressure of the fluid at the high-pressure connection can be reduced.

During operation of the pump, a leakage flow of some of the conveyed fluid occurs in the pump and/or in the check valve system. The leakage flow in the pump passes to the shaft of the pump and is conducted away via a pressure equalization line to the low-pressure connection. The leakage flow in the check valve system passes via the first valve connection to the low-pressure connection. Owing to the leakage flow, the pump can be operated normally, and a pressure at the control input can be maintained without damaging the pump. Furthermore, no additional line is needed to discharge the fluid when pressure is built up and maintained at the control connection. The conveyed fluid for pressure buildup at the control connection is conducted away via the leakage flow and/or the pressure equalization line to the low-pressure connection. Since a leakage flow occurs in each operating state of the pump, a pressure equalization line is needed anyway. Therefore, no line is needed between the first pump connection and the control connection. This reduces a complexity of the hydraulic circuit.

The check valve system has at least one first check valve. The first check valve is connected to the first valve connection at a first check valve connection and to the second valve connection at a second check valve connection. The first check valve is designed to prevent a fluid flow from the second check valve connection to the first check valve connection and to allow a fluid flow from the first check valve connection to the second check valve connection. This allows an efficient pressure buildup at the high-pressure connection in a first state, since no further hydraulic elements representing a hydraulic resistance are arranged between the first valve connection and the second valve connection.

The first check valve is designed as a stop-check valve. The first check valve has a first check valve control connection via which a fluid flow from the second check valve connection to the first check valve connection can be enabled. The first check valve control connection is fluidically connected to the control connection. The function of the check valve system can thus be implemented by means of a single check valve, and the system complexity of the hydraulic circuit can be kept low.

The check valve has a displacement volume, a piston and a check element. The check element is configured to prevent a fluid flow from the second check valve connection to the first check valve connection in a third state of the check element. The check element is configured to enable a fluid flow from the second check valve connection to the first check valve connection in a fourth state of the check element. The piston is configured such that, when a fluid flows into the displacement volume via the control connection and the fluid builds up a pressure in the displacement volume, the piston moves in a first direction and shifts the check element into the fourth state. The check valve has a leakage flow between the check valve control connection and the first check valve connection via the displacement volume. Thanks to the above design of the displacement volume and the piston, an additional line for transporting away the leakage flow can be omitted. This simplifies a production of the hydraulic circuit.

The check valve system has at least one first throttle. The first throttle is connected directly to the second valve connection. The first check valve and the first throttle are connected fluidically in series with one another. This allows a slower fluid flow from the high-pressure connection, through the throttle and the check valve system. Owing to the slower fluid flow, the fluid flow and thus a pressure reduction at the high-pressure connection can be controlled more simply.

The check valve system has at least one second check valve and a third valve connection. The third valve connection is fluidically connected to the second pump connection. The second check valve is connected to the third valve connection at a third check valve connection and to the second valve connection at a fourth check valve connection. The second check valve is designed to prevent a fluid flow from the fourth check valve connection to the third check valve connection and to allow a fluid flow from the third check valve connection to the fourth check valve connection.

In the check valve system, therefore, a first hydraulic path, between the first valve connection and the second valve connection, and a second hydraulic path, between the third valve connection and the second valve connection, can be designed to be separate from one another. The second hydraulic path allows only a fluid flow through the second check valve to the second valve connection and the high-pressure connection and thus a pressure buildup at the high-pressure connection. Likewise, a fluid can be conveyed to the high-pressure connection and thus a pressure at the high-pressure connection can be increased via the first hydraulic path and via the first check valve. Thanks to the fluidic parallel arrangement of the first check valve and the second check valve, a fluid resistance between the second pump connection and the high-pressure connection are reduced, and the efficiency of the hydraulic circuit is increased.

No fluid can be conducted away from the high-pressure connection and thus pressure reduced via the second hydraulic path. In the second state, the first hydraulic path allows a fluid flow from the high-pressure connection via the first stop-check valve to the first valve connection and thus a pressure reduction at the high-pressure connection. This allows a controlled pressure reduction at the high-pressure connection.

By an arrangement of the first throttle between the second valve connection and the second check valve connection, a fluid flow and thus a pressure reduction at the high-pressure connection can be slowed, via the first hydraulic path, in the second state. This improves the controllability of the pressure reduction at the high-pressure connection during the second state. Furthermore, the efficiency during the pressure buildup is increased, since the fluid can flow from the first pump connection to the high-pressure connection additionally via the second hydraulic path without having to pass through a throttle.

The check valve system has a third check valve. The third check valve is fluidically connected to the second valve connection at a fifth check valve connection and is fluidically connected to the second check valve connection at a sixth check valve connection. The third check valve is designed to prevent a fluid flow from the fifth check valve connection to the sixth check valve connection and to allow a fluid flow from the sixth check valve connection to the fifth check valve connection. The third check valve is arranged fluidically parallel to the first throttle.

In the first state, a fluid flows through the first valve connection, the first check valve and the second valve connection and increases a pressure at the high-pressure connection. Between the first check valve and the second valve connection, this fluid flow flows in part through the third check valve and in part through the first throttle. This arrangement represents a low fluid resistance to the fluid flow in comparison with the entire fluid flow passing exclusively through the first throttle. This arrangement improved the efficiency of the check valve system. In the second state, the third check valve prevents a fluid flow from the fifth check valve connection to the sixth check valve connection. The entire fluid flow flows from the high-pressure connection, through the second valve connection, the first throttle, the first check valve and the first valve connection. Since the entire fluid flow flows through the first throttle between the second valve connection and the first valve connection, this entire fluid flow is slowed down. This facilitates control of the pressure reduction at the high-pressure connection. This embodiment thus allows both an efficient pressure buildup and a better controllability of the pressure reduction at the high-pressure connection.

The check valve system has a second throttle, a fourth check valve and a fifth check valve. The second throttle, the fourth check valve and the fifth check valve are arranged fluidically between the first check valve and the first valve connection. The fourth check valve is fluidically connected to the first check valve connection at a seventh check valve connection and to the first valve connection at an eighth check valve connection. The fourth check valve is designed to prevent a fluid flow from the seventh check valve connection to the eighth check valve connection and to allow a fluid flow from the eighth check valve connection to the seventh check valve connection. The fifth check valve is arranged anti-parallel to the fourth check valve. The fifth check valve is fluidically connected to the first check valve connection at a ninth check valve connection and to the first valve connection at a tenth check valve connection. The fifth check valve is designed to prevent a fluid flow from the tenth check valve connection to the ninth check valve connection and to allow a fluid flow from the ninth check valve connection to the tenth check valve connection. The second throttle is arranged fluidically between the tenth check valve connection and the second valve connection and parallel to the fourth check valve.

In the first state, the fluid flows from the first pump connection, through the fourth check valve and the first check valve, to the high-pressure connection, and a pressure at the high-pressure connection increases. The orientation of the fifth check valve prevents a fluid flow via the fifth check valve and thus via the second throttle in the first state. This permits a high efficiency in the first state, since no losses occur as a result of the second throttle. In the second state, the fluid flows from the high-pressure connection to the first valve connection, through the fifth check valve and the second throttle. The fourth throttle blocks the fluid flow in the second state, and all the fluid flows through the fifth check valve and the second throttle. The fluid flow is slowed down by the second throttle, as a result of which a fluid flow is easier to control in the second state. This embodiment thus allows an efficient pressure increase at the high-pressure connection in the first state and an easy to control pressure reduction at the high-pressure connection in the second state.

The check valve system has a fourth valve connection, a sixth check valve in the form of a stop-check valve, and a third throttle. The fourth valve connection is fluidically connected to the low-pressure connection. The sixth check valve is fluidically connected to the fourth valve connection at an eleventh check valve connection and to the second valve connection at a twelfth check valve connection. The sixth check valve is designed to prevent a fluid flow from the twelfth check valve connection to the eleventh check valve connection and to allow a fluid flow from the eleventh check valve connection to the twelfth check valve connection. The sixth check valve has a second check valve control connection via which a fluid flow from the twelfth check valve connection to the eleventh check valve connection can be enabled. The second check valve control connection is fluidically connected to the control connection.

In the first state, the fluid flows at least via the first valve connection and the second valve connection to the high-pressure connection and increases a pressure at the high-pressure connection. In this case, no fluid flows via the third throttle. In the second state, a fluid flows from the first pump output via the control connection to the second check valve control connection. The sixth check valve thereby allows a fluid flow from the high-pressure connection via the second valve connection and the fourth valve connection to the low-pressure connection and allows a pressure reduction. In this case, the fluid also flows through the third throttle and is slowed down. This improves a controllability of the pressure reduction at the high-pressure connection without impairing an efficiency during pressure buildup at the high-pressure connection.

The hydraulic circuit has a pressure-limiting valve. The pressure-limiting valve is connected to the high-pressure connection at a first pressure-limiting valve connection and is connected to the low-pressure connection at a second pressure-limiting valve connection. The pressure-limiting valve is connected to the high-pressure connection and the low-pressure connection in parallel with the pump system and with the supply unit. The pressure-limiting valve opens when there is an overpressure at the high-pressure connection and allows a fluid flow directly from the high-pressure connection to the low-pressure connection until the overpressure at the high-pressure connection is reduced.

The supply unit has a seventh check valve and an eighth check valve. The seventh check valve is connected to the low-pressure connection at a thirteenth check valve connection and connected to the first pump connection at a fourteenth check valve connection. The seventh check valve is designed to prevent a fluid flow from the fourteenth check valve connection to the thirteenth check valve connection and to allow a fluid flow from the thirteenth check valve connection to the fourteenth check valve connection. The eighth check valve is connected to the low-pressure connection at a fifteenth check valve connection and connected to the second pump connection at a sixteenth check valve connection. The eighth check valve is designed to prevent a fluid flow from the sixteenth check valve connection to the fifteenth check valve connection and to allow a fluid flow from the fifteenth check valve connection to the sixteenth check valve connection. The functionality of the supply unit can thus be implemented reliably and by means of simple hydraulic elements. This reduces the complexity and the production costs of the hydraulic circuit.

The supply unit is designed as a two-pressure valve. This reduces the number of necessary components in the hydraulic circuit and permits a more compact design of the hydraulic circuit.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Further details, advantages and features of the present invention can be found in the following description of exemplary embodiments with reference to the drawings. In the figures.

Corresponding reference numerals indicate corresponding parts throughout the several views of the drawings.

DETAILED DESCRIPTION

Example embodiments will now be described more fully with reference to the accompanying drawings.

Figure 1:
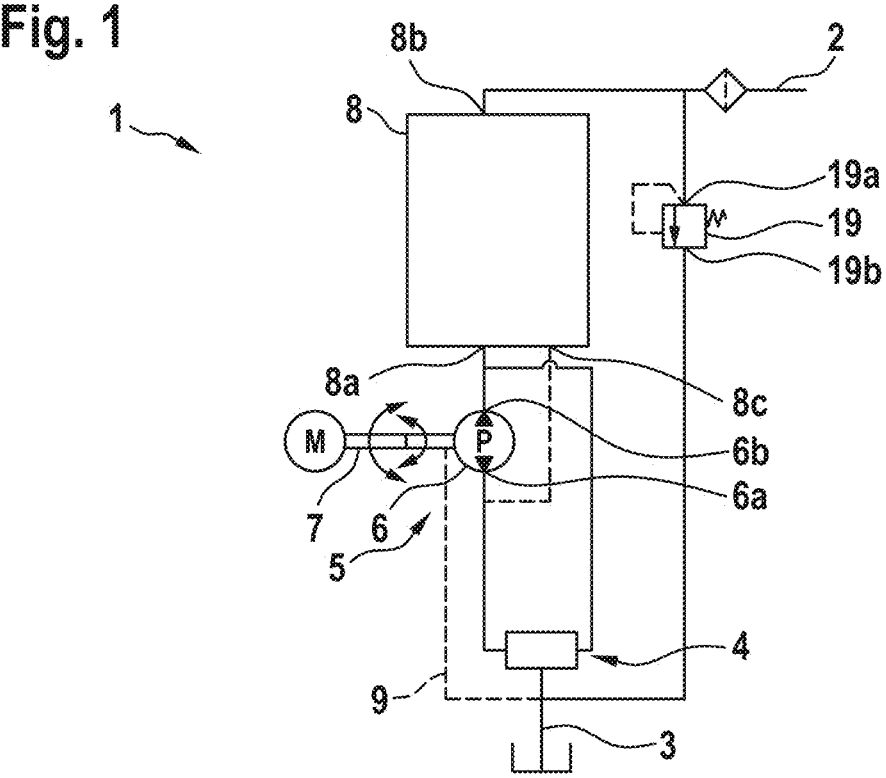
FIG. 1 shows a schematic diagram of a hydraulic circuit according to a first exemplary embodiment of the invention.

FIG. 1 shows a schematic diagram of a hydraulic circuit according to a first exemplary embodiment of the invention.

The hydraulic circuit 1 comprises a high-pressure connection 2, a low-pressure connection 3, a supply unit 4, and a pump system 5. The low-pressure connection 3 is fluidically connected to the high-pressure connection 2 by means of a series circuit of the supply unit 4 and the pump system 5. The pump system 5 has a pump 6 for conveying a fluid, a shaft 7 for driving the pump 6, and a stop-check valve system 8. The pump 6 is configured to convey the fluid from a first pump connection 6a to a second pump connection 6b in a first state and to convey the fluid from the second pump connection 6b to the first pump connection 6a in a second state. The check valve system 8 is fluidically connected to the second pump connection 6b at a first valve connection 8a and to the high-pressure connection 2 at a second valve connection 8b. The check valve system 8 is designed to prevent a fluid flow from the second valve connection 8b to the first valve connection 8a and to allow a fluid flow from the first valve connection 8a to the second valve connection 8b. The check valve system 8 has a control connection 8c via which a fluid flow from the second valve connection 8b to the first valve connection 8a can be enabled. The hydraulic circuit 1 is designed to enable the fluid flow from the second valve connection 8b to the first valve connection 8a via the control connection 8c when the pump 6 is in the second state. The supply unit 4 is configured to allow a fluid flow from the low-pressure connection 3 at the first pump connection 6a and to prevent a fluid flow from the second pump connection 6b to the low-pressure connection 3 in a first state of the pump 6. The supply unit 4 is configured to allow a fluid flow from the low-pressure connection 3 at the second pump connection 6b and to prevent a fluid flow from the first pump connection 6a to the low-pressure connection 3 in a second state of the pump 6. The pump 6 has a leakage flow towards the shaft 7 when the fluid is conveyed. The shaft 7 is connected to the low-pressure connection 3 by means of a pressure equalization line 9 in order to conduct the fluid away from the shaft 7.

In the first state, the fluid is drawn in from the low-pressure connection 3 via the first pump connection 6a and conveyed via the second pump connection 6b to the first valve connection 8a. The supply unit 4 prevents a backflow of the fluid from the second pump connection 6b to the low-pressure connection 3. The fluid is then conveyed through the check valve system 8 to the second valve connection 8b and the high-pressure connection 2. In the first state, a fluid is thus conveyed from the low-pressure connection 3 through the pump 6 and the check valve system 8 into the high-pressure connection 2, and a pressure of the fluid at the high-pressure connection 2 is increased. A fluid can thus be supplied to the high-pressure connection 2 in an actively controllable manner by actuation of the pump 6. If the pump 6 ceases conveying, fluid no longer passes from the low-pressure connection 3 through the pump 6 and the check valve system 8 to the high-pressure connection 2. A backflow of the fluid out of the high-pressure connection 2 through the pump 6 to the low-pressure connection 3 is prevented by the check valve system 8.

In the second state, the fluid is drawn in from the low-pressure connection 3 via the second pump connection 6b and conveyed via the first pump connection 6a to the control connection 8c of the check valve system 8. The supply unit 4 prevents a backflow of the fluid from the first pump connection 6a to the low-pressure connection 3. Owing to the pressure buildup at the first control connection 8c, the check valve system 8 allows a fluid flow from the high-pressure connection 2 via the second valve connection 8b the check valve system 8 and the first valve connection 8a. A fluid can thus be conducted away from the high-pressure connection 2 in an actively controllable manner by actuation of the pump 6, and a pressure of the fluid at the high-pressure connection 2 can be reduced.

During operation of the pump 6, a leakage flow of some of the conveyed fluid occurs in the pump 6 and/or in the check valve system 8. The leakage flow passes to the shaft 7 of the pump 6 and is conducted away via a pressure equalization 9 to the low-pressure connection 3. The leakage flow in the check valve system 8 passes via the first valve connection 8a to the low-pressure connection 3. Owing to the leakage flow, the pump 6 can be operated normally, and a pressure at the control connection 8c can be maintained without damaging the pump 6. Therefore, no line is needed between the first pump connection 6a and the control connection 8c. This reduces a complexity of the hydraulic circuit 1.

The hydraulic circuit 1 has a pressure-limiting valve 19. The pressure-limiting valve 19 is connected to the high-pressure connection 2 at a first pressure-limiting valve connection 19a and to the low-pressure connection 3 at a second pressure-limiting valve connection 19a. The pressure-limiting valve 19 is connected to the high-pressure connection 2 and the low-pressure connection 3 in parallel with the pump system 5 and the supply unit 4. The pressure-limiting valve 19 opens when there is an overpressure at the high-pressure connection 2 and allows a fluid flow directly from the high-pressure connection 2 to the low-pressure connection 3 until the overpressure at the high-pressure connection 2 is reduced.

The supply unit 4 is designed as a two-pressure valve 22. This reduces the number of necessary components in the hydraulic circuit 1 and permits a more compact design of the hydraulic circuit 1.

Figure 2:
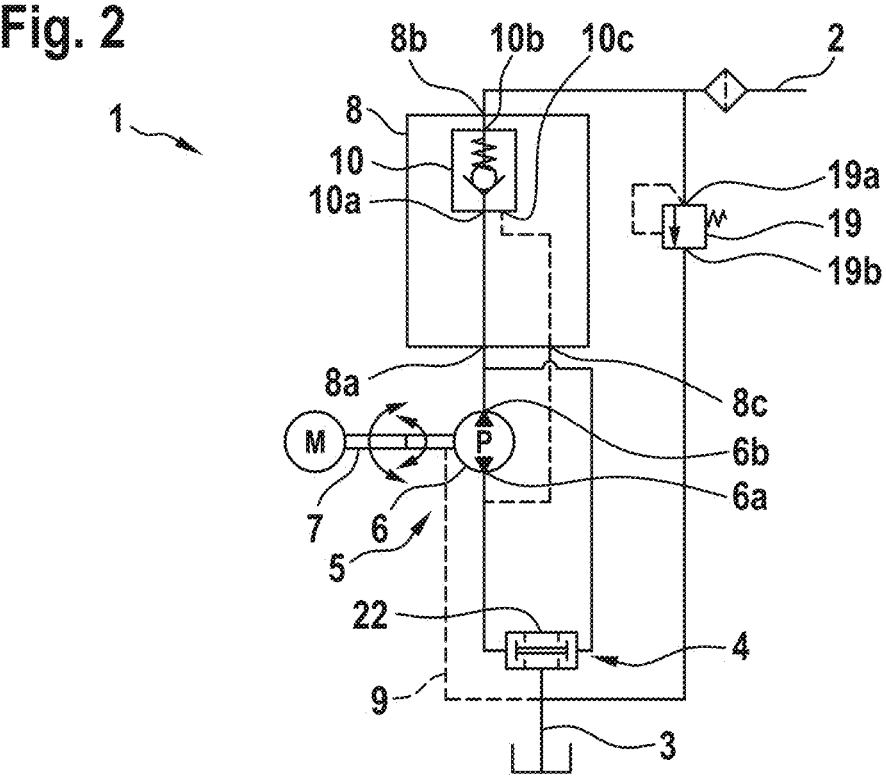
FIG. 2 shows a schematic diagram of a hydraulic circuit according to a second exemplary embodiment of the invention.

FIG. 2 shows a schematic diagram of a hydraulic circuit 1 according to a second exemplary embodiment of the invention.

The second exemplary embodiment of FIG. 2 is based on similar features to the first exemplary embodiment of FIG. 1.

The check valve system 8 additionally has a first stop-check valve 10. The first stop-check valve 10 is connected to the first valve connection 8a at a first check valve connection 10a and to the second valve connection 8b at a second check valve connection 10b. The first stop-check valve 10 is designed to prevent a fluid flow from the second check valve connection 10b to the first check valve connection 10a and to allow a fluid flow from the first check valve connection 10a to the second check valve connection 10b. This allows an efficient pressure buildup at the high-pressure connection 2 in the first state, since no further hydraulic elements representing a hydraulic resistance are arranged between the first valve connection 8a and the second valve connection 8b.

The first stop-check valve 10 has a first check valve control connection 10c via which a fluid flow from the second check valve connection 10b to the first check valve connection 10a can be enabled. The first check valve control connection 10c is fluidically connected to the control connection 8c. The function of the check valve system 8 can thus be implemented by means of a single check valve 10, and the system complexity of the hydraulic circuit can be kept low.

Figure 3:
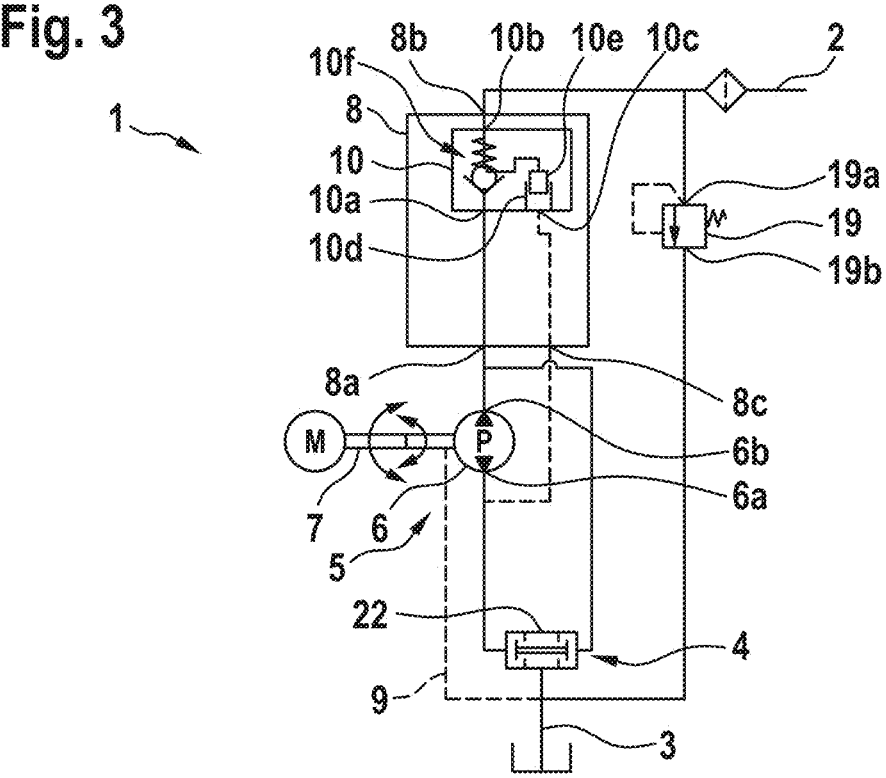
FIG. 3 shows a schematic diagram of a hydraulic circuit according to a third exemplary embodiment of the invention.

FIG. 3 shows a schematic diagram of a hydraulic circuit 1 according to a third exemplary embodiment. The third exemplary embodiment is based on similar features to the second exemplary embodiment.

The check valve 10 has a displacement volume 10f, a piston 10e and a check element 10f. The check element 10f is configured to prevent a fluid flow from the second check valve connection 10b to the first check valve connection 10a in a third state of the check element 10f. The check element 10f is configured to enable a fluid flow from the second check valve connection 10b to the first check valve connection 10a in a fourth state of the check element 10f. The piston 10e is configured such that, when a fluid flows into the displacement volume 10d via the control connection 8c and the fluid builds up a pressure in the displacement volume 10d, the piston 10e moves in a first direction and shifts the check element 10f into the fourth state. The check valve 10 has a leakage flow between the check valve control connection 10c and the first check valve connection 10a via the displacement volume 10d. Thanks to the above design of the displacement volume and the piston, an additional line for transporting away the leakage flow can be omitted. This simplifies a production of the hydraulic circuit 1.

Figure 4:
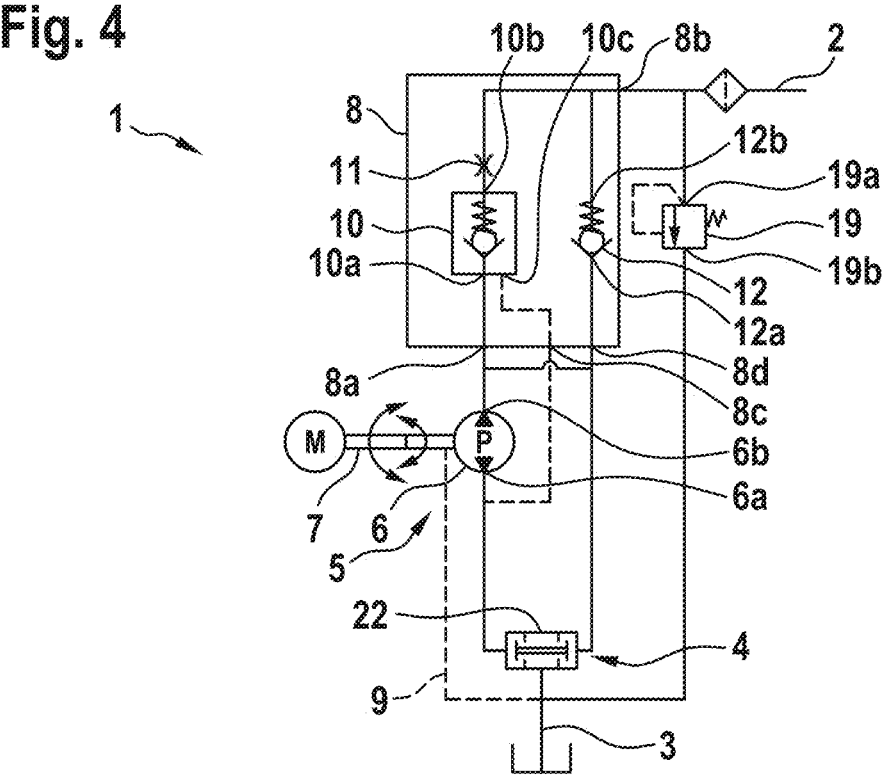
FIG. 4 shows a schematic diagram of a hydraulic circuit according to a fourth exemplary embodiment of the invention.

FIG. 4 shows a schematic diagram of a hydraulic circuit 1 according to a fourth exemplary embodiment of the invention. The fourth exemplary embodiment of FIG. 4 is based on similar features to the third exemplary embodiment of FIG. 3.

In addition, the check valve system 8 has a first throttle 11. The first throttle 11 is connected directly to the second valve connection 8b. The first check valve 10 and the first throttle 11 are connected fluidically in series with one another. This permits a slower fluid flow from the high-pressure connection 2 through the first throttle 11 and the first check valve 10. Owing to the slower fluid flow, the fluid flow and thus a pressure reduction at the high-pressure connection 2 can be controlled more simply.

The check valve system 8 has a second check valve 12 and a third valve connection 8d. The third valve connection 8d is fluidically connected to the second pump connection 6b. The second check valve 12 is fluidically connected to the third valve connection 8d at a third check valve connection 12a and to the second valve connection 8b at a fourth check valve connection 12b. The second check valve 12 is designed to prevent a fluid flow from the fourth check valve connection 12b to the third check valve connection 12a and to allow a fluid flow from the third check valve connection 12a to the fourth check valve connection 12b.

In the check valve system 8, therefore, a first hydraulic path, between the first valve connection 8a and the second valve connection 8b, and a second hydraulic path, between the third valve connection 8d and the second valve connection 8b, can be designed to be separate from one another. The second hydraulic path allows a fluid flow only through the second check valve 12 to the second valve connection 8b and the high-pressure connection 2 and thus a pressure buildup at the high-pressure connection 2. Likewise, a fluid can be conveyed to the high-pressure connection 2 and thus a pressure at the high-pressure connection 2 can be increased via the first hydraulic path via the first check valve 10. Thanks to the fluidic parallel arrangement of the first check valve 10 and the second check valve 12, a fluid resistance between the second pump connection 6b and the high-pressure connection 2 are reduced, and the efficiency of the hydraulic circuit 1 is increased.

No fluid can be conducted away from the high-pressure connection 2 and thus pressure reduced via the second hydraulic path. In the second state, the first hydraulic path allows a fluid flow from the high-pressure connection 2 via the first stop-check valve 10 to the first valve connection 8a and thus a pressure reduction at the high-pressure connection 2. This permits a controlled pressure reduction at the high-pressure connection 2.

By an arrangement of the first throttle 11 between the second valve connection 8b and the second check valve connection 10b, a fluid flow and thus a pressure reduction at the high-pressure connection 2 can be slowed, via the first hydraulic path, in the second state. This improves the controllability of the pressure reduction at the high-pressure connection 2 during the second state. Furthermore, the efficiency during the pressure buildup is increased, since the fluid can flow from the first pump connection 6a to the high-pressure connection 2 also via the second hydraulic path without having to pass through a throttle.

Figure 5:
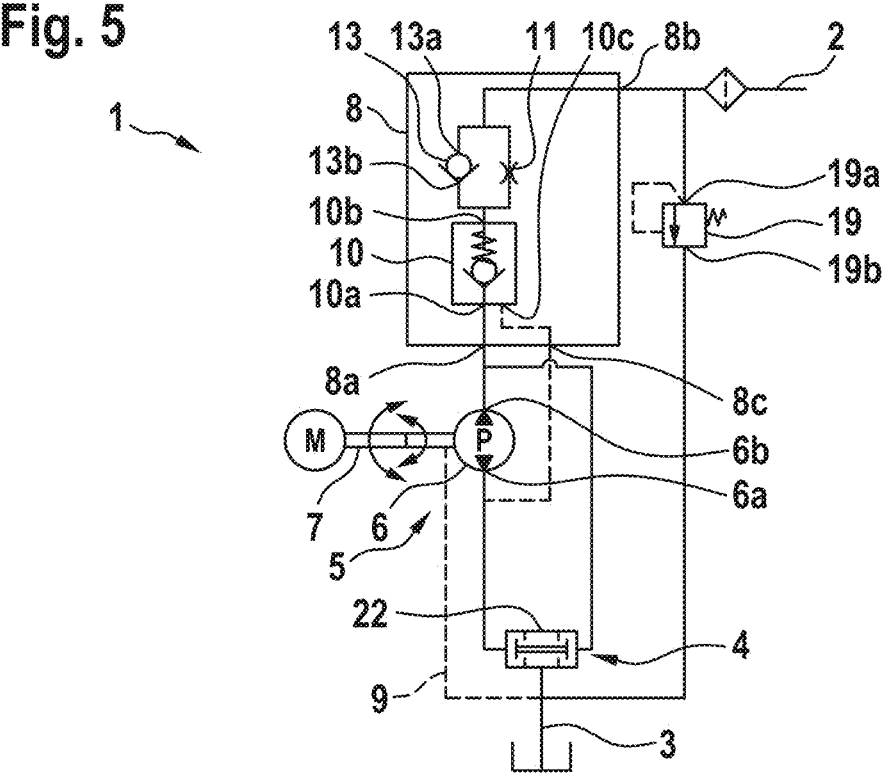
FIG. 5 shows a schematic diagram of a hydraulic circuit according to a fifth exemplary embodiment of the invention.

FIG. 5 shows a schematic diagram of a hydraulic circuit according to a fifth exemplary embodiment of the invention. The fifth exemplary embodiment of FIG. 5 is based on similar features to the fourth exemplary embodiment of FIG. 4.

In addition, the check valve system 8 has a third check valve 13. The third check valve 13 is fluidically connected to the second valve connection 8b at a fifth check valve connection 13a and to the second check valve connection 10b at a sixth check valve connection 13b. The third check valve 13 is designed to prevent a fluid flow from the fifth check valve connection 13a to the sixth check valve connection 13b and to allow a fluid flow from the sixth check valve connection 13b to the fifth check valve connection 13a. The third check valve 13 is arranged fluidically parallel to the first throttle 11.

In the first state, a fluid flows through the first valve connection 8a, the first check valve 10 and the second valve connection 8b and increases a pressure at the high-pressure connection 2. Between the first check valve 10 and the second valve connection 8b, some of this fluid flow flows through the third check valve 13 and some flows through the first throttle 11. This arrangement forms a low fluid resistance to the fluid flow in comparison with the entire fluid flow passing through the first throttle 11. This arrangement improves the efficiency of the check valve system 8. In the second state, the third check valve 13 prevents a fluid flow from the fifth check valve connection 13a to the sixth check valve connection 13b. The entire fluid flow flows from the high-pressure connection 2, through the second valve connection 8b, the first throttle 11, the first check valve 10 and the first valve connection 8a. Since the entire fluid flow flows through the first throttle 11 between the second valve connection 8b and the first valve connection 8a, this entire fluid flow is slowed down. This simplifies control of the pressure reduction at the high-pressure connection. This exemplary embodiment thus permits both an efficient pressure buildup and a better controllability of the pressure reduction at the high-pressure connection 2.

Figure 6:
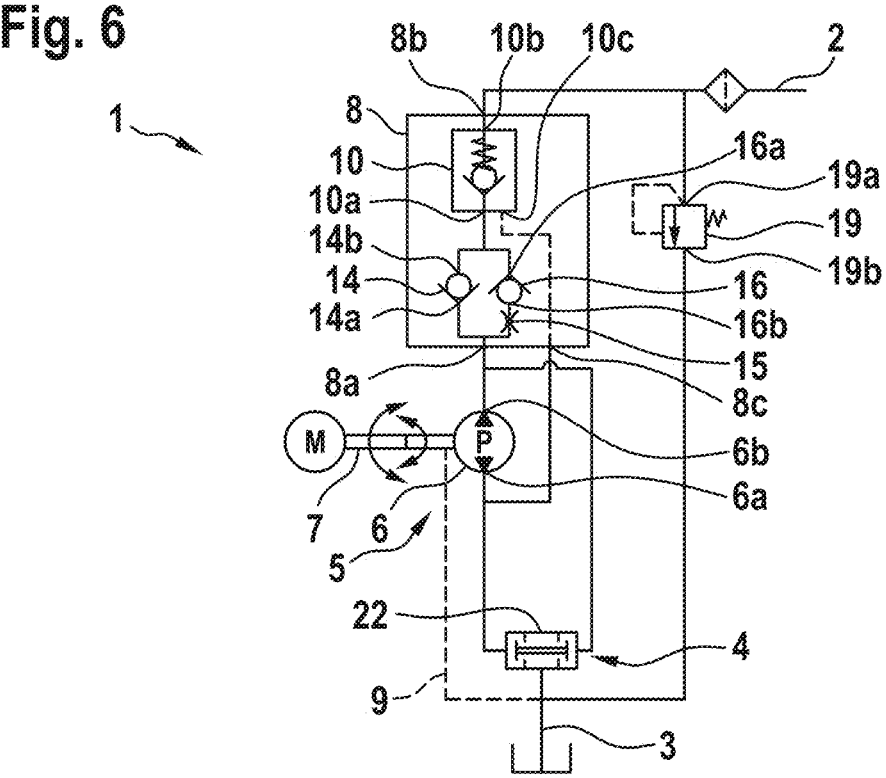
FIG. 6 shows a schematic diagram of a hydraulic circuit according to a sixth exemplary embodiment of the invention.

FIG. 6 shows a schematic diagram of a hydraulic circuit according to a sixth exemplary embodiment of the invention. The sixth exemplary embodiment of FIG. 6 is based on similar features to the second exemplary embodiment of FIG. 2 and/or the third exemplary embodiment of FIG. 3.

The check valve system 8 has a second throttle 15, a fourth check valve 14 and a fifth check valve 16. The second throttle 15, the fourth check valve 14 and the fifth check valve 16 are arranged fluidically between the first check valve 10 and the first valve connection 8a. The fourth check valve 14 is fluidically connected to the first check valve connection 10a at a seventh check valve connection 14b and to the first valve connection 8a at an eighth check valve connection 14a. The fourth check valve 14 is designed to prevent a fluid flow from the seventh check valve connection 14b to the eighth check valve connection 14a and to allow a fluid flow from the eighth check valve connection 14a to the seventh check valve connection 14b.

The fifth check valve 16 is arranged anti-parallel to the fourth check valve 14. The fifth check valve 16 is fluidically connected to the first check valve connection 10a at a ninth check valve connection 16a and to the first valve connection 8a at a tenth check valve connection 16b. The fifth check valve 16 is designed to prevent a fluid flow from the tenth check valve connection 16b to the ninth check valve connection 16a and to allow a fluid flow from the ninth check valve connection 16a to the tenth check valve connection 16b. The second throttle 15 is arranged fluidically between the tenth check valve connection 16b and the second valve connection 8b and parallel to the fourth check valve 14.

In the first state, the fluid flows from the first pump connection 6a, through the fourth check valve 14 and the first check valve 10, to the high-pressure connection 2, and a pressure at the high-pressure connection 2 increases. The orientation of the fifth check valve 16 prevents a fluid flow via the fifth check valve 16 and thus via the second throttle 15 in the first state. This permits a high efficiency in the first state, since no losses occur as a result of the second throttle 15. In the second state, the fluid flows from the high-pressure connection 2 to the first valve connection 8a, through the fifth check valve 16 and the second throttle 15. The fourth check valve 14 blocks the fluid flow in the second state, and all the fluid flows through the fifth check valve 16 and the second throttle 15. The fluid flow is slowed down by the second throttle 15, as a result of which a fluid flow is simpler to control in the second state. This embodiment thus allows an efficient pressure increase at the high-pressure connection 2 in the first state and a simple to control pressure reduction at the high-pressure connection 2 in the second state.

Figure 7:
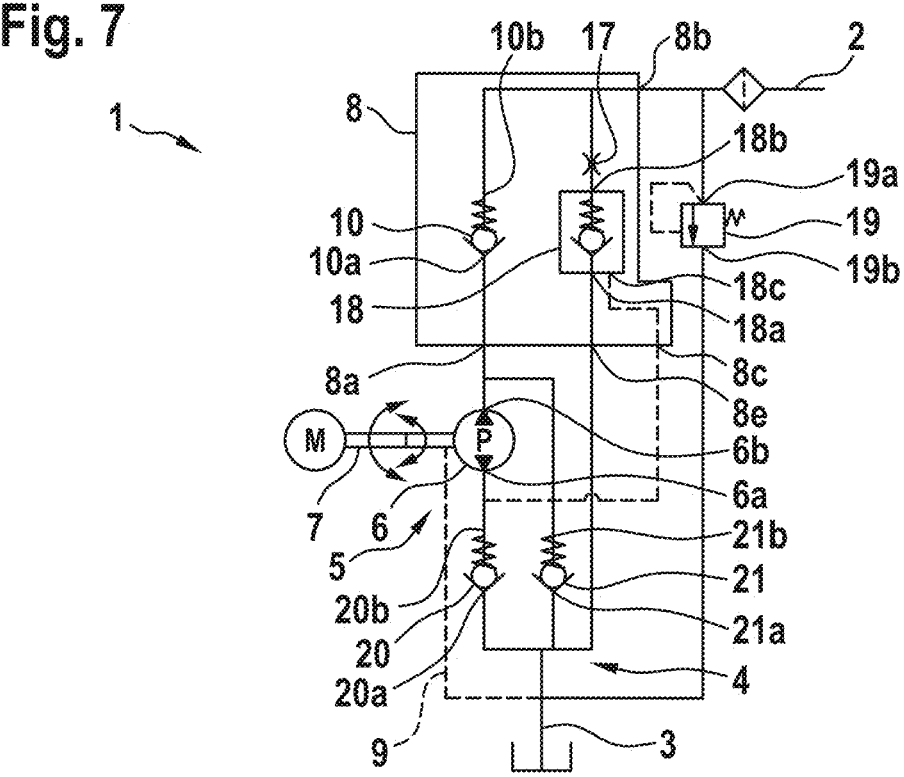
FIG. 7 shows a schematic diagram of a hydraulic circuit according to a seventh exemplary embodiment of the invention.

FIG. 7 shows a schematic diagram of a hydraulic circuit according to a seventh exemplary embodiment of the invention.

The seventh exemplary embodiment of FIG. 7 is based on similar features to the first exemplary embodiment of FIG. 1.

In addition, the check valve system 8 has a first check valve 10, a fourth valve connection 8e, a sixth check valve 18 in the form of a stop-check valve, and a third throttle 17. The first check valve 10 is connected to the first valve connection 8a at a first check valve connection 10a and to the second valve connection 8b at a second check valve connection 10b. The first check valve 10 is designed to prevent a fluid flow from the second check valve connection 10b to the first check valve connection 10a and to allow a fluid flow from the first check valve connection 10a to the second check valve connection 10b.

The fourth valve connection 8e is fluidically connected to the low-pressure connection 3. The sixth check valve 18 is fluidically connected to the fourth valve connection 8e with an eleventh check valve connection 18a and to the second valve connection 8b with a twelfth check valve connection 18b. The sixth check valve 18 is designed to prevent a fluid flow from the twelfth check valve connection 18b to the eleventh check valve connection 18a and to allow a fluid flow from the eleventh check valve connection 18a to the twelfth check valve connection 18b. The sixth check valve 18 has a second check valve control connection 18c via which a fluid flow from the twelfth check valve connection 18b to the eleventh check valve connection 18a can be enabled. The second check valve control connection 18c is fluidically connected to the control connection 8c.

In the first state, the fluid flows via the first valve connection 8a and the second valve connection 8b through the first check valve to the high-pressure connection 2 and increases a pressure at the high-pressure connection 2. In this case, no fluid flows via the third throttle 17 or another throttle. In the second state, the first check valve 10 prevents a fluid flow from the second check valve connection 8b to the first valve connection 8a. The fluid flows from the first pump output 6a via the control connection 8c to the second check valve control connection 18c. The sixth check valve 18 thereby allows a fluid flow from the high-pressure connection 2 via the second valve connection 8b and the fourth valve connection 8e to the low-pressure connection 3 and makes possible a pressure reduction via here. In this case, the fluid flows through the third throttle 17 and is slowed down. This improves a controllability of the pressure reduction at the high-pressure connection 2 without impairing an efficiency during pressure buildup at the high-pressure connection 2.

Figure 8:
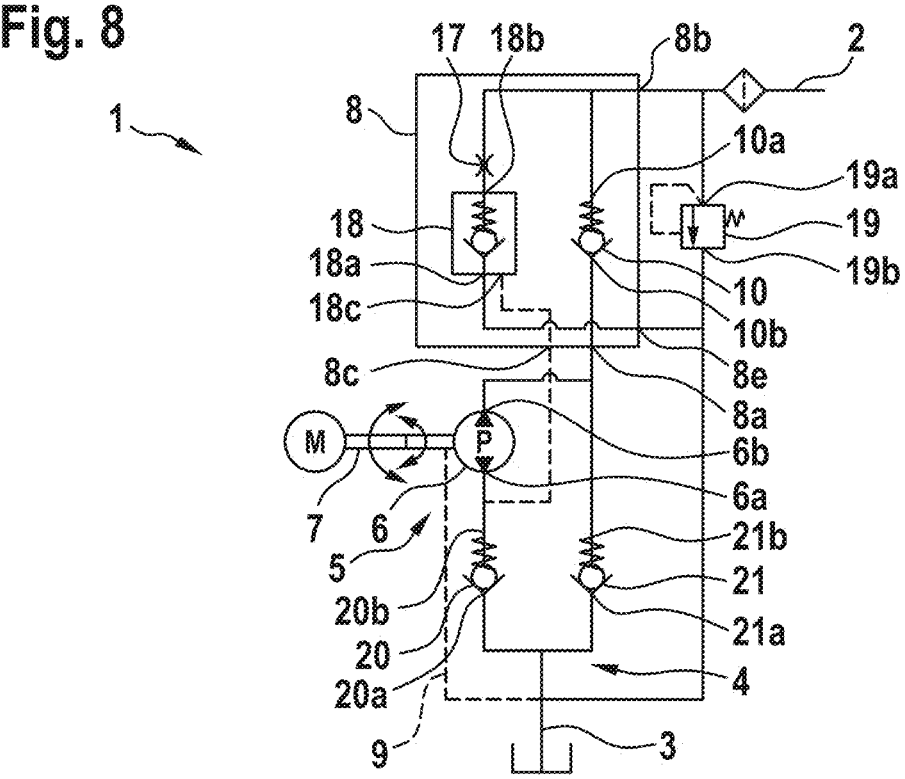
FIG. 8 shows a schematic diagram of a hydraulic circuit according to an eighth exemplary embodiment of the invention.

FIG. 8 shows a schematic diagram of a hydraulic circuit according to an eighth exemplary embodiment of the invention.

The eighth exemplary embodiment of FIG. 8 is based on similar features to the first exemplary embodiment of FIG. 1.

In addition, the check valve system 8 has a first check valve 10. The first check valve is connected to the first valve connection 8a at a first check valve connection 10a and to the second valve connection 8b at a second check valve connection 10b. The first check valve 10 is designed to prevent a fluid flow from the second check valve connection 10b to the first check valve connection 10a and to allow a fluid flow from the first check valve connection 10a to the second check valve connection 10b. This allows an efficient pressure buildup at the high-pressure connection 2 in a first state, since no further hydraulic elements representing a hydraulic resistance are arranged between the first valve connection 8a and the second valve connection 8b.

The check valve system 8 has a fourth valve connection 8e, a sixth check valve 18 in the form of a stop-check valve, and a third throttle 17. The fourth valve connection 8e is fluidically connected to the low-pressure connection 3. The sixth check valve 18 is fluidically connected to the fourth valve connection 8e at an eleventh check valve connection 18a and to the second valve connection 8b with a twelfth check valve connection 18b. The sixth check valve 18 is designed to prevent a fluid flow from the twelfth check valve connection 18b to the eleventh check valve connection 18a and to allow a fluid flow from the eleventh check valve connection 18a to the twelfth check valve connection 18b. The sixth check valve 18 has a second check valve control connection 18c via which a fluid flow from the twelfth check valve connection 18b to the eleventh check valve connection 18a can be enabled. The second check valve control connection 18c is fluidically connected to the control connection 8c.

In the first state, the fluid flows through the first valve connection 8a, the first check valve 10 and the second valve connection 8b to the high-pressure connection 2 and increases a pressure at the high-pressure connection 2. In this case, no fluid flows via the third throttle 17. In the second state, the first check valve 10 prevents a fluid flow from the second check valve connection 8b to the first valve connection 8a. A fluid flows from the first pump output 6a via the control connection 8c to the second check valve control connection 18c. The sixth check valve 18 thereby allows a fluid flow from the high-pressure connection 2 via the second valve connection 8b and the fourth valve connection 8e to the low-pressure connection 3 and makes possible a pressure reduction via here. In this case, the fluid also flows through the third throttle 17 and is slowed down. This improves a controllability of the pressure reduction at the high-pressure connection 2 without impairing an efficiency during pressure buildup at the high-pressure connection 2.

Figure 9:
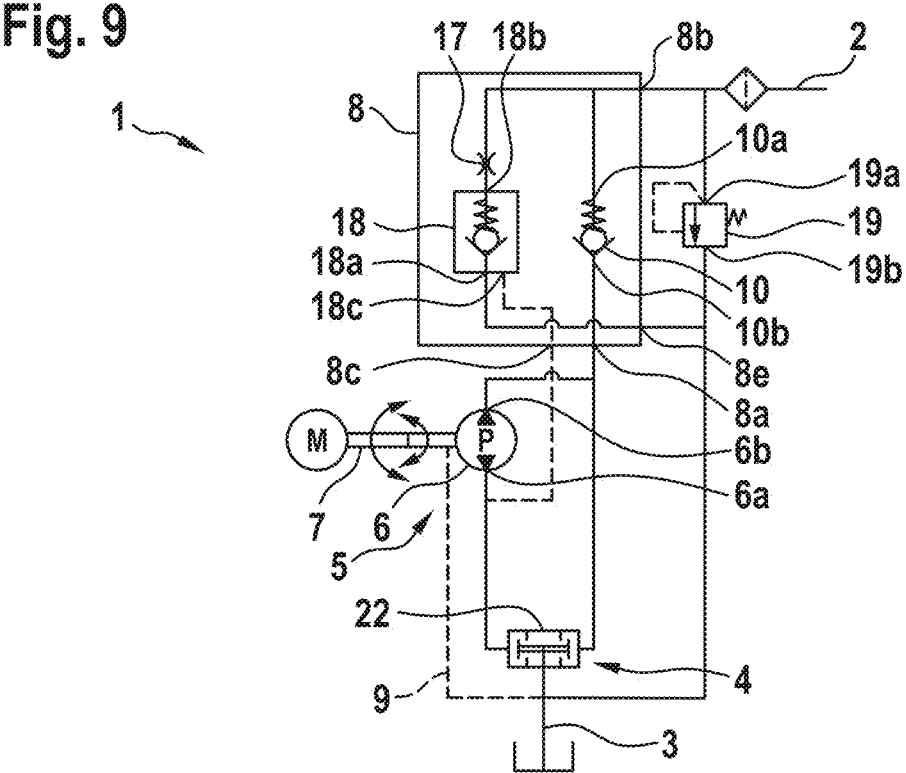
FIG. 9 shows a schematic diagram of a hydraulic circuit according to a ninth exemplary embodiment of the invention.

FIG. 9 shows a schematic diagram of a hydraulic circuit according to a ninth exemplary embodiment of the invention.

The ninth exemplary embodiment of FIG. 9 is an alternative exemplary embodiment of the eighth exemplary embodiment from FIG. 8. The ninth exemplary embodiment has an alternative design of the supply unit 4. Instead of the seventh check valve 20 and the eighth check valve 21, the supply unit 4 is designed as a two-pressure valve 22 in the ninth exemplary embodiment. This reduces the number of necessary components in the hydraulic circuit 1 and permits a more compact design of the hydraulic circuit 1.

In addition to the written description of the invention above, reference is hereby explicitly made to the illustration of the invention in FIGS. 1 to 8 for the supplementary disclosure of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

LIST OF REFERENCE SIGNS

1 Hydraulic circuit
2 High-pressure connection
3 Low-pressure connection
4 Supply unit
5 Pump system
6 Pump
6a First pump connection
6b Second pump connection
7 Shaft
8 Check valve system
8a First valve connection
8b Second valve connection
8c Control connection
80 Third valve connection
8e Fourth valve connection
9 Pressure equalization line
10 First check valve
10a First check valve connection
10b Second check valve connection
10c First check valve control connection
10d Displacement volume
10e Piston
10f Check element
11 First throttle
12 Second check valve
12a Third check valve connection
12b Fourth check valve connection
13 Third check valve
13a Fifth check valve connection
13b Sixth check valve connection
14 Fourth check valve
14a Eighth check valve connection
14b Seventh check valve connection
15 Second throttle
16 Fifth check valve
16a Ninth check valve connection
16b Tenth check valve connection
17 Third throttle
18 Sixth check valve
18a Eleventh check valve connection
18b Twelfth check valve connection
18c Second check valve control connection
19 Pressure-limiting valve
19a First pressure-limiting valve connection
19b Second pressure-limiting valve connection
20 Seventh check valve
20a Thirteenth check valve connection
20b Fourteenth check valve connection
21 Eighth check valve
21a Fifteenth check valve connection
21b Sixteenth check valve connection
22 Two-pressure valve

What is claimed is:
1. A hydraulic circuit comprising
a high-pressure connection, a low-pressure connection,
a supply unit, and
a pump system,
wherein the low-pressure connection is fluidically connected to the high-pressure connection by means of a series circuit of the supply unit and the pump system,
wherein the pump system has a pump for conveying a fluid, a shaft for driving the pump, and at least one stop-check valve system,
wherein the pump is configured to convey the fluid from a first pump connection to a second pump connection in a first state and to convey the fluid from the second pump connection to the first pump connection in a second state,
wherein the check valve system is fluidically connected to the second pump connection at a first valve connection and to the high-pressure connection at a second valve connection,
wherein the check valve system is configured to prevent a fluid flow from the second valve connection to the first valve connection and to allow a fluid flow from the first valve connection to the second valve connection,
wherein the check valve system has a control connection via which a fluid flow from the second valve connection to the first valve connection is enabled,
wherein the hydraulic circuit is configured to enable the fluid flow from the second valve connection to the first valve connection via the control connection when the pump is in the second state,
wherein the supply unit is configured to allow a fluid flow from the low-pressure connection at the first pump connection and to prevent a fluid flow from the second pump connection to the low-pressure connection in a first state of the pump,
wherein the supply unit is configured to allow a fluid flow from the low-pressure connection at the second pump connection and to prevent a fluid flow from the first pump connection to the low-pressure connection in a second state of the pump,
wherein
the pump has a leakage flow towards the shaft when the fluid is conveyed, and the shaft is connected to the low-pressure connection by a pressure equalization line in order to conduct the fluid away from the shaft, and/or
the check valve system has a leakage flow between the control connection and the first valve connection when the pump is in the second state.

2. The hydraulic circuit according to claim 1, wherein the check valve system has at least one first check valve,
wherein the first check valve is connected to the first valve connection at a first check valve connection and to the second valve connection at a second check valve connection, and
wherein the first check valve is configured to prevent a fluid flow from the second check valve connection to the first check valve connection and to allow a fluid flow from the first check valve connection to the second check valve connection.

3. The hydraulic circuit according to claim 2, wherein the first check valve is configured as a stop-check valve,
wherein the first check valve has a first check valve control connection via which a fluid flow from the second check valve connection to the first check valve connection is enabled, and
wherein the first check valve control connection is fluidically connected to the control connection.

4. The hydraulic circuit according to claim 2, wherein the check valve has a displacement volume, a piston and a check element,
wherein the check element is configured to prevent a fluid flow from the second check valve connection to the first check valve connection in a third state of the check element,
wherein the check element is configured to enable a fluid flow from the second check valve connection to the first check valve connection in a fourth state of the check element,
wherein the piston is configured, when there is a pressure buildup in the displacement volume, to move in a first direction via the control connection and to shift the check element into the fourth state, and
wherein the check valve has a leakage flow between the check valve control connection and the first check valve connection via the displacement volume.

5. The hydraulic circuit according to claim 1, wherein the check valve system has at least one first throttle,
wherein the first throttle is arranged between the first valve connection and the second valve connection, and
wherein the first check valve and the first throttle are connected fluidically in series with one another.

6. The hydraulic circuit according to claim 2, wherein the check valve system has at least one second check valve and a third valve connection,
wherein the third valve connection is fluidically connected to the second pump connection,
wherein the second check valve is connected to the third valve connection at a third check valve connection and to the second valve connection at a fourth check valve connection, and
wherein the second check valve is designed to prevent a fluid flow from the fourth check valve connection to the third check valve connection and to allow a fluid flow from the third check valve connection to the fourth check valve connection.

7. The hydraulic circuit according to claim 5, wherein the check valve system has a third check valve,
wherein the third check valve is fluidically connected to the second valve connection with a fifth check valve connection and is fluidically connected to the second check valve connection with a sixth check valve connection,
wherein the third check valve is configured to prevent a fluid flow from the fifth check valve connection to the sixth check valve connection and to allow a fluid flow from the sixth check valve connection to the fifth check valve connection, and
wherein the third check valve is arranged fluidically parallel to the first throttle.

8. The hydraulic circuit according to claim 3, wherein the check valve system has a second throttle, a fourth check valve and a fifth check valve,
wherein the second throttle, the fourth check valve and the fifth check valve are arranged fluidically between the first check valve and the first valve connection,
wherein the fourth check valve is fluidically connected to the first check valve connection at a seventh check valve connection and to the first valve connection at an eighth check valve connection,
wherein the fourth check valve is configured to prevent a fluid flow from the seventh check valve connection to the eighth check valve connection and to allow a fluid flow from the eighth check valve connection to the seventh check valve connection, wherein the fifth check valve is arranged anti-parallel to the fourth check valve, wherein the fifth check valve is fluidically connected to the first check valve connection at a ninth check valve connection and to the first valve connection at a tenth check valve connection, wherein the fifth check valve is configured to prevent a fluid flow from the tenth check valve connection to the ninth check valve connection and to allow a fluid flow from the ninth check valve connection to the tenth check valve connection, and wherein the second throttle is arranged fluidically between the tenth check valve connection and the second valve connection and parallel to the fourth check valve.

9. The hydraulic circuit according to claim 2, wherein that the check valve system has a fourth valve connection, a sixth check valve in the form of a stop-check valve, and has a third throttle, wherein the fourth valve connection is fluidically connected to the low-pressure connection, wherein the sixth check valve is fluidically connected to the fourth valve connection with an eleventh check valve connection and to the second valve connection with a twelfth check valve connection, and wherein the sixth check valve is configured to prevent a fluid flow from the twelfth check valve connection to the eleventh check valve connection and to allow a fluid flow from the eleventh check valve connection to the twelfth check valve connection, wherein the sixth check valve has a second check valve control connection via which a fluid flow from the twelfth check valve connection to the eleventh check valve connection is enabled, and wherein the second check valve control connection is fluidically connected to the control connection.

10. The hydraulic circuit according to claim 1, wherein a pressure-limiting valve is connected to the high-pressure connection at a first pressure-limiting valve connection and is connected to the low-pressure connection at a second pressure-limiting valve connection, wherein the pressure-limiting valve is connected to the high-pressure connection and the low-pressure connection in parallel with the pump system and with the supply unit.

11. The hydraulic circuit according to claim 1, wherein the supply unit has a seventh check valve and an eighth check valve, wherein the seventh check valve is connected to the low-pressure connection at a thirteenth check valve connection and connected to the first pump connection at a fourteenth check valve connection, wherein the seventh check valve is configured to prevent a fluid flow from the fourteenth check valve connection to the thirteenth check valve connection and to allow a fluid flow from the thirteenth check valve connection to the fourteenth check valve connection, wherein the eighth check valve is connected to the low-pressure connection at a fifteenth check valve connection and connected to the second pump connection at a sixteenth check valve connection, wherein the eighth check valve is designed to prevent a fluid flow from the sixteenth check valve connection to the fifteenth check valve connection and to allow a fluid flow from the fifteenth check valve connection to the sixteenth check valve connection.

12. The hydraulic circuit according to claim 1, wherein the supply unit is configured as a two-pressure valve.

\* \* \* \* \*